United States Patent [19]

Wahl et al.

[11] Patent Number: 4,662,175
[45] Date of Patent: May 5, 1987

[54] FLUID SUPPLY CIRCUIT FOR A HYDRODYNAMIC COUPLING

[76] Inventors: Georg Wahl, Wilhelm-von-Kettelerstr. 33; Wolfgang von Berg, In den Riedwiesen 14, both of 7180 Crailsheim, Fed. Rep. of Germany

[21] Appl. No.: 796,647

[22] Filed: Nov. 8, 1985

[30] Foreign Application Priority Data

Nov. 14, 1984 [DE] Fed. Rep. of Germany ....... 3441510

[51] Int. Cl.⁴ ............................................. F16D 33/06
[52] U.S. Cl. ....................................... 60/337; 60/357
[58] Field of Search ............... 60/358, 357, 359, 360, 60/336, 337, 338, 352, 356, 355

[56] References Cited

U.S. PATENT DOCUMENTS 3,635,026  1/1972  Hahn et al. .......................... 60/358
4,201,050  5/1980  Nixel .................................... 60/359

FOREIGN PATENT DOCUMENTS 0069351  5/1980  Japan .................................... 60/357
0167532 10/1982  Japan .................................... 60/357
0724834  4/1980  U.S.S.R. ............................... 60/337

Primary Examiner—Harry Tanner
Attorney, Agent, or Firm—Jeffers, Irish & Hoffman

[57] ABSTRACT

A fluid circuit for a hydrodynamic coupling comprises a circuit line which is connected to the outlet of the coupling and which extends via a cooler and via a flow control element back to the inlet of the coupling. An overflow valve serving for limiting pressure and the delivery line of a filling pump are connected to the circuit line in front of the flow control element in the flow direction. Arranged in the delivery line are a fixed-setting throttle element, for example a diaphragm, and, parallel to this, a high-speed filling valve which opens automatically when the pressure prevailing in the circuit line in front of the flow control element falls below a specific limiting value.

10 Claims, 1 Drawing Figure

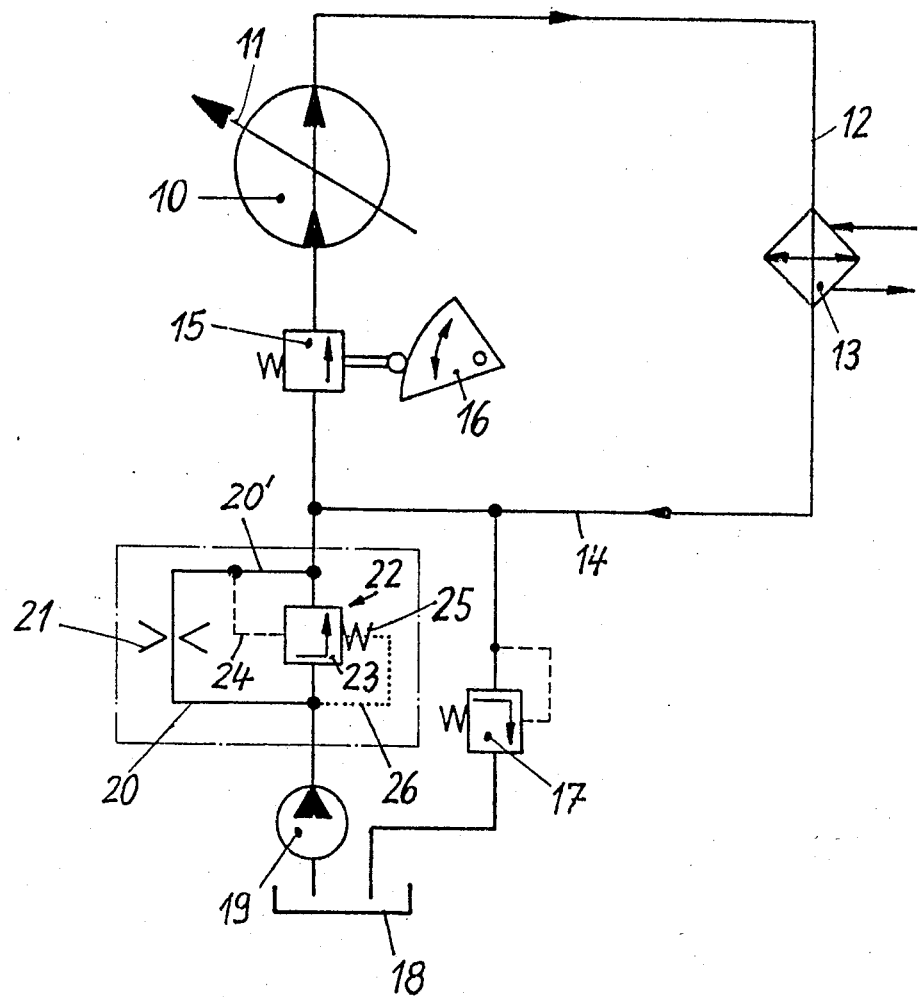

FLUID SUPPLY CIRCUIT FOR A HYDRODYNAMIC COUPLING

The invention relates to fluid supply circuits for hydrodynamic couplings.

In our own publication Cr101, entitled "Voith Geared Variable-Speed Turbo Coupling Drives", we disclose a fluid supply circuit for a hydrodynamic coupling, the circuit comprising a cooler, flow control means, a fluid flow and return line operative to receive fluid from a hydrodynamic coupling and return fluid to the coupling via the cooler and flow control means, overflow valve means connected to said flow and return line upstream of said control means and operative to limit pressure in said flow and return line, and a supply line for a filling pump, which supply line is connected to said flow and return line upstream of said flow control means.

The purpose of the overall fluid circuit is to dissipate heat due to energy losses which arise in the hydrodynamic coupling during power transmission, and, if required, adjust the rate of filling of the coupling, for example in order to vary the coupling slip (especially to vary the secondary speed). The fluid is usually kept in circulation through the flow and return line without any special pumping device; that is to say, the hydrodynamic coupling itself ensures circulation of the fluid, preferably by means of a movable scoop tube provided for adjusting the filling rate. In other embodiments, the pumping effect of coupling impellers can also cause the fluid to flow through the flow and return line.

When the coupling is started, the associated filling pump causes the flow and return line and the coupling to be filled with fluid. During normal operation, this filling pump needs to convey fluid into the circuit line essentially only when the filling rate of the coupling is to be increased. Otherwise, it serves merely for the subsequent feeding of a small quantity of fluid to compensate any fluid losses. When the filling rate of the coupling is to be reduced by adjusting the scoop tube, the excess amount of fluid flows through the overflow valve means into a storage vessel, from which the filling pump sucks the fluid up again, as required.

Fluid circuits of the type described above have proved appropriate in many drive systems with hydrodynamic couplings. However, it has occasionally been observed that the machine to be driven by means of the coupling (for example, a boiler feed pump) does not run with the desired stability of speed. We have ascertained that the cause of this has been that, during normal operation, the filling pump conveyed an excessive amount of fluid into the circuit, so that the conveying capacity of the scoop tube was exceeded. The result of this, at least from time to time, was that too high a coupling filling rate was set unintentionally, or the coupling was even "flooded".

Attempts have been made hitherto to eliminate this danger of flooding the coupling and of the instabilities of speed from it, by installing a throttle element (diaphragm, throttle or the like) in the supply line from the filling pump. However, this throttle element only acts in the desired way when the throttle cross-section is fairly small. This in turn gives rise to the disadvantage that, during starting, that is to say during the run-up of the machine driven by the coupling, or in the event of an increase in the coupling filling rate subsequently required (for example, to increase the secondary speed), the fluid flow passing through the throttle element is too small. In other words, the run-up of the machine to be driven, or a desired increase in speed, takes place too slowly.

Preferred embodiments of the invention aim to mitigate these disadvantages, such that a hydrodynamic coupling may on the one hand operate with a high stability of speed and, on the other hand, react as quickly as possible during starting and in the event of a desired increase in speed.

More generally, according to the present invention, there is provided a fluid supply circuit for a hydrodynamic coupling, the circuit comprising:

a supply line operative to receive fluid from a filling pump and pass the fluid to a hydrodynamic coupling;

throttling means connected in said supply line to restrict the flow of fluid through said supply line; and valve means connected in said supply line parallel with said throttling means and operative to open automatically in response to the fluid pressure prevailing downstream of said valve means and throttling means falling below a threshold value, thereby to increase the flow of fluid in said supply line.

We have found that preferred embodiments of the invention may reliably prevent flooding, of a coupling, but nevertheless guarantee rapid filling of the coupling, this being necessary to achieve fast regulating and starting operations. The throttling means connected in the supply line from a filling pump may ensure a constantly open minimum throughflow cross-section which is sufficient to compensate for small top-up quantities during stationary operation of the coupling. Moreover, the valve means, which is preferably a high-speed filling valve, arraged parallel to the throttling means, may ensure that an enlarged throughflow cross-section is temporarily available for larger-scale, especially rapid filling and regulating operations. It is particularly favourable, here, that the opening of the valve means is triggered automatically as a result of a drop in the fluid pressure which prevails at its outlet, and therefore at the entrance of the filling pump supply line into a flow and return line of the coupling. This makes skilful use of the fact that, in response to a command to start or to increase the secondary speed, the scoop tube of the coupling (mentioned above) is adjusted in such a way that its delivery rate and its delivery pressure tend towards zero. This is reflected by a drop in pressure in the flow and return line, which then triggers the opening of the valve means, so that the filling pump can quickly feed a large quantity of fluid into the flow and return line and into the coupling.

For a better understanding of the invention and to show how the same may be carried into effect, reference will now be made, by way of example, to the accompanying diagramatic drawing, the single FIGURE of which is a schematic diagram of a hydrodynamic coupling and a fluid supply circuit therefor, including a filling pump.

The symbol denoted by 10 represents the hydrodynamic coupling. This serves, for example, for coupling a power source (not shown) to a driven machine (also not shown but, for example, a boiler feed pump), of variable speed. The hydrodynamic coupling 10 has an external fluid circuit. This is composed of a fluid flow line 12 connected a fluid outlet of the coupling 10 to a cooler 13, and of a fluid return line 14 connecting the cooler 13 to the fluid inlet of the coupling 10 via a flow control valve 15. The arrow 11 indicates symbolically that the filling rate of the hydrodynamic coupling 10 is variable, preferably by means of a known moveable scoop tube (not shown in the drawings). Preferably, as is known from our above-mentioned publication Cr101, a setting device for the scoop tube is coupled mechanically to a cam disc 16 which, simultaneously with the adjustment of the scoop tube, adjusts the throughflow cross-section of the control valve 15. In special cases, however, a non-controllable throttle or diaphragm can be provided instead of the adjustable flow control valve 15.

Connected to the return line 14 of the circuit is an overflow valve 17 which serves for limiting pressure in the flow and return line 12, 14, and the outlet of which opens into a fluid sump 18. A filling pump 19 sucks up fluid from the sump 18 as required and conveys it into the return line 14 of the circuit via a supply line 20. The entrance of the supply line 20, 20' into the return line 14 is located upstream of the flow control valve 15. A throttle element 21 (throttle, diaphragm or the like), having a fixed throttling aperture, is connected between the parts 20 and 20' of the supply line.

A so-called high-speed filling valve 22 is also connected between the parts 20, 20' of the supply line, in parallel with the throttle element 21. That is to say, the pump 19 can, if required, also feed fluid into the return line 14 via the high-speed filling valve 22. A moveable valve body 23 of the high-speed filling valve 22 is biased towards its closed position, represented symbolically by the control line 24, as a result of the pressure prevailing downstream of the throttle element 21 in the part 20' of the filling-pump supply line (and therefore also in the return line 14). The force of a spring 25 counteracts this pressure. This spring 25 opens the high-speed filling valve 22 automatically when the pressure prevailing at its outlet (or, in other words, in the lines 20' and 14) falls below a specific limiting value. As explained above, this may occur particularly when the pressure generated by a scoop tube of the coupling drops in the circuit line 12, 14 in response to a control command to accelerate the working machine. As long as the pressure in the lines 20' and 14 is above the said limiting value, the high-speed filling valve 22 is closed.

The filling pump 19 used is preferably a centrifugal pump. Should the delivery pressure of this pump fluctuate for any reason, it is expedient to make the opening of the high-speed filling valve 22 also dependent on this delivery pressure (that is to say, the pressure in the upstream part 20 of the supply line). That is to say, the pressure in the part 20 of the filling-pump supply line acts to open the high-speed filling valve 22, represented symbolically by the dotted control line 26. When this is provided, it is expedient to omit the compression spring 25 or arrange a compression spring on the opposite side (that is to say, on the same side as the control line 24). Thus, instead of responding to the absolute fluid pressure at its outlet, the valve 22 may response to the difference in pressure between its inlet and outlet.

In an expedient arrangement, the valve 22 may comprise a moveable valve member having formed therethrough a passage which serves as the throttling element 17, so that both the throttling means and the high speed filling valve may be combined in a single valve unit.

The invention is not restricted to the details of the foregoing embodiment(s). The invention extends to any novel one, or any novel combination, of the features disclosed in this specification and/or drawings, or to any novel one, or any novel combination, of the steps of any method or process disclosed herein.

We claim:

1. In combination with a hydrodynamic coupling and a fluid cooling circuit for said hydrodynamic coupling, said fluid cooling circuit comprising a cooler and a fluid flow and return line being operative to receive fluid from the hydrodynamic coupling and return fluid to the coupling via the cooler, a fluid supply circuit comprising:
   a source of fluid;
   a filling pump communicating with said fluid source;
   a supply line interconnecting said flow and return line of said fluid cooling circuit and said filling pump and being operative to receive fluid from said filling pump and pass the fluid to said flow and return line;
   throttling means connected in said supply line to restrict the flow of fluid through said supply line; and
   valve means connected in said supply line in parallel with said throttling means and being operative to open automatically in response to the fluid pressure prevailing in said supply line downstream of said valve means and throttling means falling below a threshold value, thereby to increase the flow of fluid through said supply line from said filling pump of said fluid supply circuit to said flow and return line of said fluid cooling circuit.

2. The combination as claimed in claim 1, wherein said fluid supply circuit further comprises an overflow valve means interconnecting said fluid source and said flow and return line and being operative to limit pressure in said flow and return line.

3. The combination as claimed in claim 2, wherein said fluid cooling circuit further comprises a flow control means connected in said flow and return line.

4. The combination as claimed in claim 3, wherein said overflow valve means is connected to said flow and return line upstream of said flow control means.

5. The combination as claimed in claim 3, wherein said supply line is connected to said flow and return line upstream of said flow control means.

6. The combination as claimed in claim 1, wherein said throttling means has a fixed throttling aperture.

7. The combination as claimed in claim 1, wherein said throttling means and said valve means are combined in a single valve unit.

8. The combination as claimed in claim 7, wherein said valve means comprises a moveable valve member having formed therethrough a passage which serves as said throttling means.

9. The combination as claimed in claim 1, wherein said threshold value is an absolute pressure value.

10. The combination as claimed in claim 1, wherein said threshold value is a relative pressure value, measured relative to the fluid pressure prevailing upstream of said throttling means and said valve means.

* * * * *